United States Patent [19]

Dobbie

[11] Patent Number: 4,658,924

[45] Date of Patent: Apr. 21, 1987

[54] AIRCRAFT GROUND-HANDLING VEHICLE

[75] Inventor: Clelland R. M. Dobbie, Loughborough, England

[73] Assignee: Air Traction Industries Limited, England

[21] Appl. No.: 867,522

[22] Filed: May 27, 1986

[30] Foreign Application Priority Data

May 28, 1985 [GB] United Kingdom ............... 8513414

[51] Int. Cl.⁴ .................................................. B64F 1/04
[52] U.S. Cl. ....................................... 180/14.1; 244/50;
280/479 A; 280/425 A; 414/732; 414/426;
180/904
[58] Field of Search ......................... 244/50, 17.17;
180/14.1, 904; 280/479 A, 425 A, 477, 478;
414/428, 732, 427, 426, 458–461, 498

[56] References Cited

U.S. PATENT DOCUMENTS

| 2,676,783 | 4/1954 | Rogers | 280/425 A |
| 2,867,451 | 1/1959 | Repke | 180/904 |
| 2,877,913 | 3/1959 | Arnot | 180/904 |
| 3,123,237 | 3/1964 | Talbert | 414/427 |
| 3,154,206 | 10/1964 | Gilleffe, Jr. et al. | 414/426 |
| 3,179,196 | 4/1965 | Richardson | 180/14.1 |
| 3,370,666 | 2/1968 | Holtzclaw et al. | 180/14.1 |
| 4,516,744 | 5/1985 | Burnside | 180/14.1 |

FOREIGN PATENT DOCUMENTS

| 1249707 | 9/1967 | Fed. Rep. of Germany | 280/479 A |
| 1105364 | 11/1965 | United Kingdom | 180/904 |

Primary Examiner—Galen Barefoot
Attorney, Agent, or Firm—Frijouf, Rust & Pyle

[57] ABSTRACT

An aircraft ground-handling vehicle has a rear turntable carried by a platform (37) which can be tilted to present a sloping surface to a nose-wheel of an aircraft. The platform (37) is positioned within the wheel base of the vehicle. A lifting arm (39) is extendable beyond the platform (37) to engage the nose-wheel axle and is raised by lifting rams (43) to raise the nose-wheel clear of the ground. The rear vehicle chassis supporting the platform (37) is then extended beneath the nose-wheel which is lowered onto the platform. The nose-wheel is then clamped, and the lifting arm (39) and the chassis (33) are retracted and the platform (37) returned to the horizontal. The aircraft can then be manoeuvred to its desired position. The vehicle does not cause damage to the ground surface or aircraft nose-wheel or tire and is not required to have a substantial weight as is the case with hitherto known such vehicles.

13 Claims, 5 Drawing Figures

AIRCRAFT GROUND-HANDLING VEHICLE

This invention relates to an aircraft ground-handling vehicle, for example for use in manoeuvring and propelling an aircraft clear of a loading stand.

Conventionally, such vehicles use a draw bar attached to the aircraft nose-wheel, but this arrangement has a number of disadvantages, viz:

1. Several different draw bars are required to cater for the many varieties of attachments to a variety of aircraft;
2. The high weight of the tug required to provide traction;
3. The overall length of the towing unit;
4. The difficulty in steering the entire coupled unit and aircraft;
5. The requirement to disconnect the aircraft steering system or torque linkages;
6. The risk of damage to the nose-wheel steering system through exceeding the arc limits;
7. The time and manpower required to connect and disconnect the draw bar;
8. The waste of a usable power unit when the vehicle is not actually performing the task of manoeuvring an aircraft; and
9. The limitation in the use of specifically weighted tugs for specific groups of aircraft weights.

To overcome some of these problems, it has been proposed to use a vehicle which carries the nose-wheel of the aircraft on the vehicle. A ground-handling vehicle of this type is disclosed in British Patent Specification No. 1 579 017, and includes a hydraulically-lifted tail ramp which is pushed along the ground and forced under the nose-wheel before lifting to bring the nose-wheel on to a turntable to permit ready manoeuvring of the aircraft during moving thereof. A potential problem with such an arrangement is that the vehicle has to be able to provide a substantial tractive force to enable the nose-wheel of a large aircraft to be forced on to the end of the ramp, and must also be stable during lifting of the ramp with the aircraft wheel thereon. Consequently, the weight of the vehicle must be substantial, even in its unloaded state, and this reduces the advantage gained from carrying the aircraft nose-wheel on the vehicle, namely that traction is increased without increasing the weight of the vehicle.

A further disadvantage is that aircraft tend to be parked at exactly the same position relative to an airport terminal, and repeated use of the ramp at the same position would damage the ground surface. It is at this position that the vehicle is most likely to be used, so as to be able to move aircraft away from the terminal. Additionally, driving the ramp against the tyres of the nose-wheels may cause damage to the tyres.

The present invention seeks to overcome these problems.

Accordingly, the present invention provides an aircraft ground-handling vehicle, comprising front and rear wheels and a turntable adapted to receive thereon an aircraft nose-wheel, the turntable being carried by a platform tiltable so as to be able to present an upwardly sloping surface to the nose-wheel before engagement thereof with the turntable, the platform being positioned relative to the wheels of the vehicle such that no part of the weight of the aircraft is transferred to the vehicle outside the wheelbase thereof, the vehicle also comprising lifting means adapted to lift the nose-wheel off the ground, without thereby loading the vehicle, to permit the platform and/or turntable to be engaged with the nose-wheel without engaging the ground, whereby the wheel is received on to the turntable as the vehicle is moved beneath the aircraft.

It is usual for commercial aircraft to have a pair of nose-wheels on a common axle, and references to "the nose-wheel" herein should be understood to include one or more pairs of nose-wheels supported on the same undercarriage assembly.

The lifting means may comprise a jack, for example of the type used in changing aircraft wheels, and may thus be carried by, but separate from the vehicle, although hydraulic power for the jack may be supplied by the vehicle. Preferably, the jack is carried by an arm extendible from the vehicle and retractable as the vehicle is moved to receive the nose-wheel. A preferred form of the lifting means comprises a wheeled device extendible from the vehicle and having at least one arm engageable with the axle of the nose-wheel, the arm being pivoted in response to further movement of the device to lift the axle.

A further problem which can arise with aircraft ground maintenance and servicing is that there may be any combination of the following items of ground equipment surrounding an aircraft:

1. An independently powered air start unit;
2. An independently powered ground power unit;
3. A tractor for the above two;
4. A conventional tug and tow bar;
5. A $CO_2$ extinguisher trolley; and
6. A compressed air bottle trolley and/or nitrogen bottle trolley.

Additionally, when a wheel or brake unit is required to be changed during a normal turn round or when the aircraft is not in a hanger, manually operated tools and wheel jacks are used to accomplish the task and there still remains the problem of transporting the very heavy wheel units to and from the aircraft on the ramp.

A preferred embodiment of the vehicle, or tug, of the present invention also provides a solution for the problems of numerous items of ground equipment surrounding an aircraft as hereinbefore mentioned. Since a conventional tug has a necessarily powerful engine whose full potential is only used while manoeuvring an aircraft, it is a waste of a power unit at other times. Thus, according to this embodiment, a sufficiently powerful generator is driven by the engine in order to provide electrical ground power facilities. As it is a further advantage to be able to provide this service at the same time as pushing back an aircraft from its stand, this embodiment allows the engine to be operated at maximum continuous RPM to drive the generator while the hydrostatic drive to the vehicle is controlled through a swash plate. The high RPM allows sufficient torque to drive both generator and vehicle and can be reduced as appropriate when the vehicle is stationary.

The tug can use hydraulic fluids and seals that are compatible with those used in aircraft. Suitable reservoirs, hoses and attachment systems permit the vehicle to act as a hydraulic test rig for aircraft, and the provision of portable power jacks linked to the system via flexible hoses permits simple and quick jacking of wheel units for wheel and brake unit changing. The tug can include a pneumatic pump of relatively small capacity to charge numerous air bottles stored within the framework of the vehicle (or a suitable direct supply compressor). These bottles are suitably arranged to hold sufficient air under pressure for the purpose of providing the capacity to start one jet engine at times when the aircraft APU is unserviceable. One further bottle may hold compressed air to power air-driven tools to facilitate rapid wheel and brake unit changes. A rechargeable nitrogen bottle may be provided for aircraft tyre inflation as well as a portable $CO_2$ fire extinguisher bottle.

A boom attached to one side of the turntable, such that when the aircraft nose-wheel is loaded on the turntable the boom runs along the right hand side of the aircraft, carries the electrical cable for ground power facilities and the intercom cable connecting the flight deck with the vehicle operator. A specially designed crate for the carriage of aircraft wheels can be transported upon the platform of the towing vehicle for online aircraft wheel changing.

Reference is made to the drawings, in which.

Figure 1:
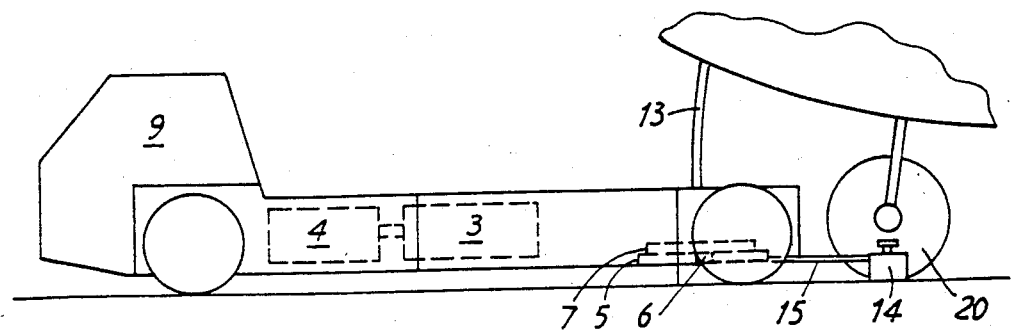
FIG. 1 is a schematic side elevation of a vehicle in accordance with a first embodiment of the invention.
Figure 2:
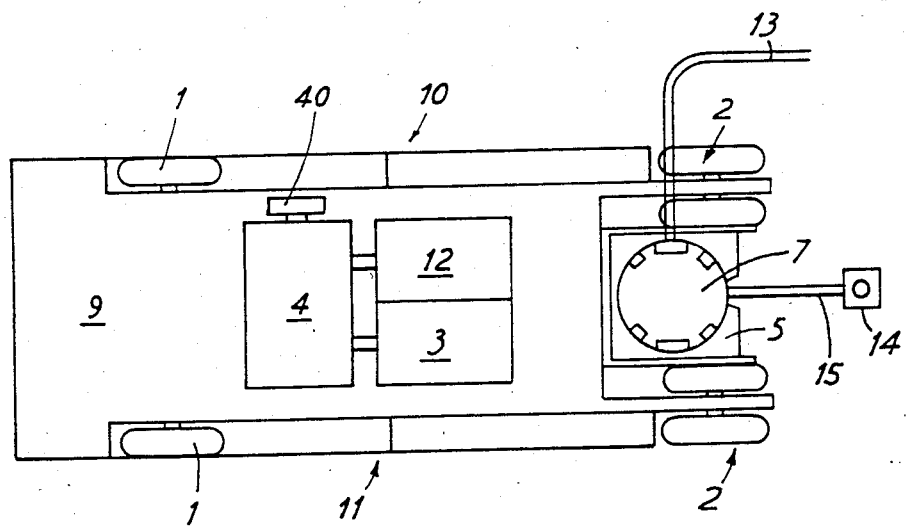
FIG. 2 is a plan view of the vehicle as shown in FIG. 1.

According to the first embodiment the vehicle comprises front wheels 1 and rear wheels 2, at least the rear wheels 2 being driven by hydraulic motors powered from a hydrostatic pump 3 driven by an internal combustion engine 4, for example a diesel engine. Mounted between the two pairs of rear wheels 2 is provided a platform 5 mounted on a transverse pivot 6 and provided with a hydraulic tilting mechanism to enable the platform to be tilted by up to, say, 5° rearwardly. A turntable 7 is mounted on the platform and carries floating collars and chocks 8 to hold aircraft nose-wheels on the turntable.

The rear wheels 2 of the vehicle are mounted by means of an over-centre mounting so that the rear end of the vehicle may be raised or lowered hydraulically.

The vehicle has a control station 9 at the front end thereof for the operator, and is provided along the sides with lockers 10 and 11 providing pneumatic and hydraulic services, and storing fire extinguishers and nitrogen supply for inflation of tyres. The engine 4 also drives a generator 12, to provide electrical ground power for the aircraft, avoiding the need for the aircraft to keep its auxiliary engine running on the ground, and so reducing running costs significantly, a diesel engine using substantially less fuel than the auxiliary engine. A boom 13 extends upwardly and outwardly from the turntable and carries electrical cable for ground power supply to the aircraft, together with intercom cable, permitting communication between the vehicle operator and the aircraft flight deck. Slip-ring connections link the cables on the turntable with the corresponding cables on the vehicle, thereby permitting free rotation of the turntable with no risk of the cables becoming tangled.

The engine 4 is also coupled to an air compressor 40 for recharging compressed-air bottles and for driving pneumatic tools, for example for use in wheel-changing, or for direct pneumatic supply.

A hydraulic jack 14 is mounted on a hydraulically-extendible arm 15, projecting from the platform 5. The jack is adapted to engage the common axle of a pair of nose-wheels, this being the most usual arrangement for current aircraft.

In use, the vehicle is positioned with the rear end carrying the platform just in front of the aircraft nose-wheels 20. The arm 15 is extended to place the jack 14 beneath the nose-wheel axle, and the jack is then extended to raise the nose-wheels just clear of the ground. With the hydraulic pressure on the arm 15 released so that the arm is freely retractible, the vehicle is then reversed towards the nose-wheels, with the platform 5 tilted downwardly towards the rear of the vehicle to present an upwardly inclined face to the nose-wheels. The platform may be suitably cut away to accommodate the jack as the arm becomes retracted by rearward movement of the vehicle.

On contacting the platform, the wheels 20 are urged on to the turntable by further rearward movement of the vehicle, the positioning of the platform relative to the rear wheels of the vehicle being such that transfer of the nose-wheel weight to the vehicle does not occur outside the wheelbase of the vehicle so that there is no tendency to lift the front of the vehicle.

When the nose-wheels are in the desired central position on the turntable, the floating collars and chocks 8 are urged hydraulically against the wheels to hold them in position, and the platform is returned to the level position. The operator can then ask the flight-deck to release the aircraft brakes, permitting the aircraft to be moved. At the same time, the vehicle continues to provide electrical power, and can, if necessary, provide compressed air to permit the engines to be started when the aircraft is clear of the terminal building, for example.

Release of the aircraft can be achieved by application of aircraft brakes, release of collars and chocks, tilting of the platform and, if appropriate, lowering of the rear of the vehicle to reduce the height of the platform from the ground, and then forward movement of the vehicle away from the aircraft, after disengagement of the cables in the boom 13 from the aircraft.

Figure 3:
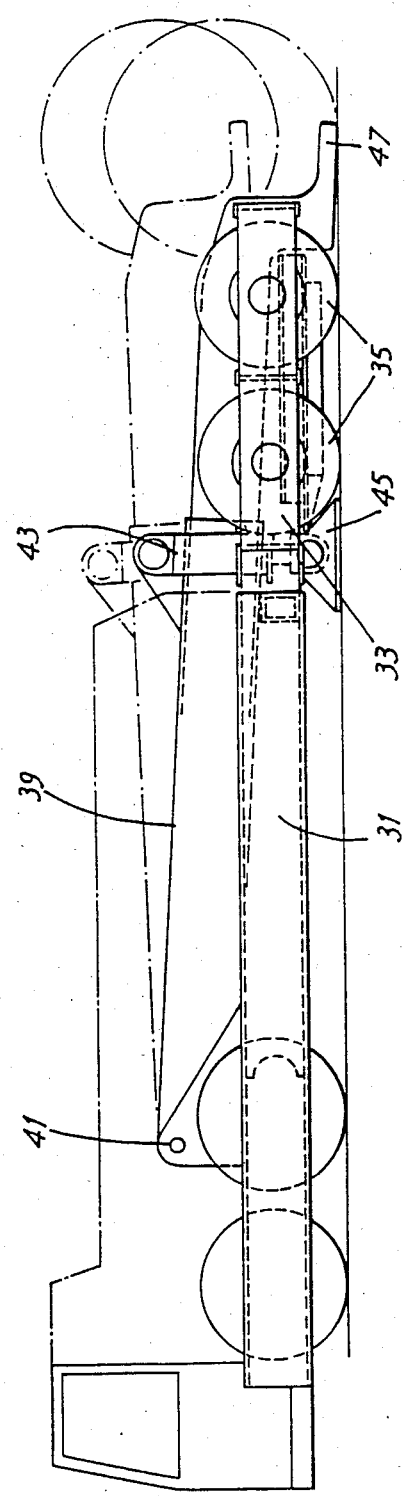
FIG. 3 is a schematic side elevation of a vehicle in accordance with a second embodiment of the invention.
Figure 4:
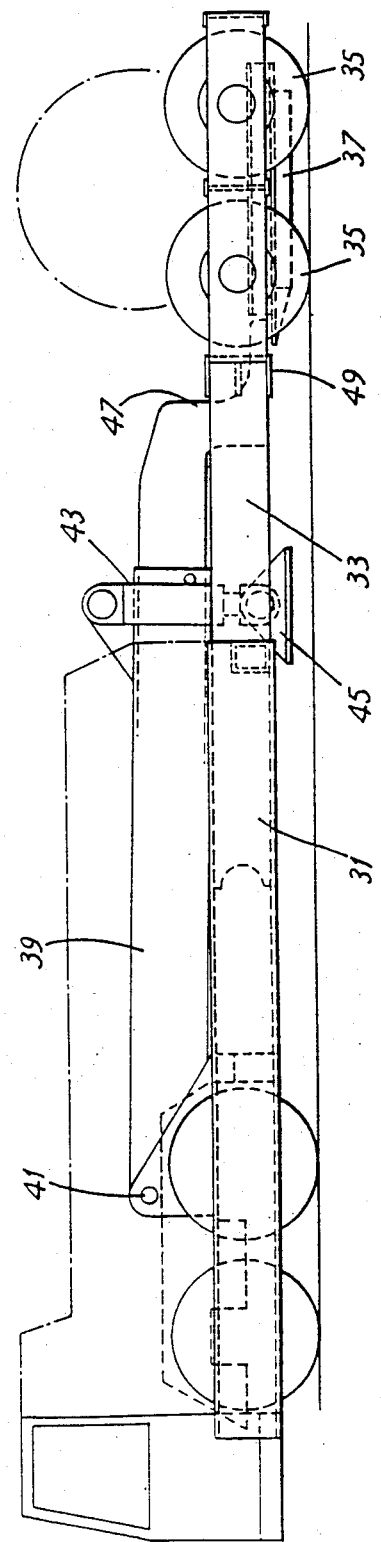
FIG. 4 is a view corresponding to FIG. 3, but showing an aircraft nose-wheel positioned on the vehicle.
Figure 5:
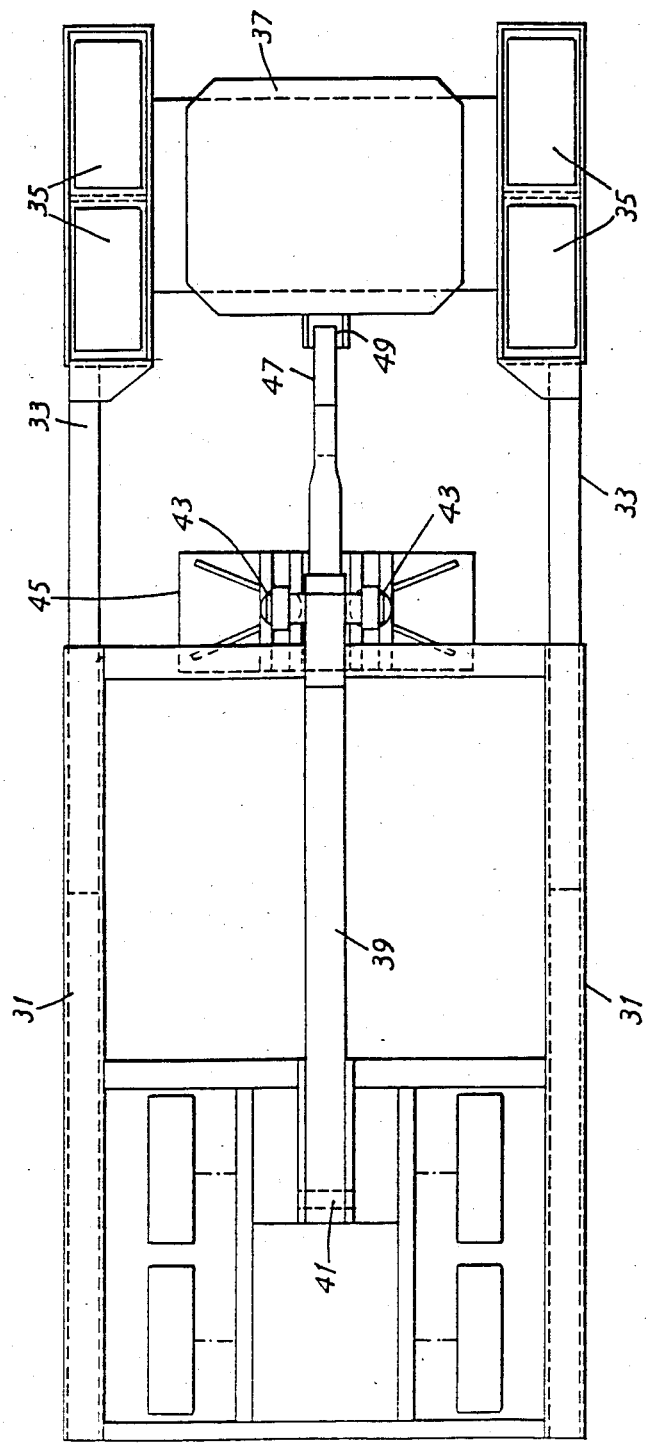
FIG. 5 is a plan view of the vehicle as shown in FIG. 4.

In the second embodiment of the invention, the vehicle has a pivoted lifting arm which engages the aircraft nose-wheel axle, the arm being lifted by ground-engaging rams within the vehicle wheelbase. Referring to FIGS. 3, 4 and 5, the vehicle has an extendable chassis comprising two box-section members 31 along part of each side of the vehicle, with rear chassis members 33 slidably mounted therein and movable by means of hydraulic rams mounted within the box-section members 31. The vehicle has four pairs of wheels, one or more hydraulically driven, hydraulic power being provided by an engine (not shown) on the front chassis section.

A turntable 37 is mounted between the rear wheels 35 in such a manner that the height of the turntable surface from the ground is kept to a minimum. The turntable is also tiltable rearwardly by means of a cam when receiving the aircraft nose-wheel thereon, the turntable being returned to the horizontal when towing the aircraft. A floating collar (not shown) is provided on the platform to hold the aircraft nose-wheel during towing.

A lifting arm 39 is mounted on a pivot 41 on the front chassis section, and has a pair of hydraulic lifting rams 43 mounted thereon at a position forward of the rear wheels 35. The rams are pivotally coupled to a ground-engaging pad 45. The lifting arm 39 is telescopically extendable by a hydraulic ram contained therewithin, and has a lifting member 47 at the free end thereof, adapted to engage and hold the nose-wheel axle of an aircraft, during lifting thereof. When not in use, the lifting member 47 rests on a suppport 49 at the front end of the turntable 37.

In use, the vehicle is positiined immediately in front of the aircraft nose-wheel, with the turntable 37 angled towards the wheel. The lifting rams 43 are extended to lift the arm 39 clear of the turntable 37 and the arm is then hydraulically extended until the lifting member 47 is positioned beneath the nose-wheel axle. Further extension of the rams 43 then lifts the aircraft nose-wheel sufficiently for the turntable 37 to be positioned beneath the wheel by extension of the rams within the box section members 31, effectively extending the length of the vehicle. The rams 43 can then be retracted to enable the lifting member to be withdrawn, and the turntable is returned to the horizontal. The nose-wheel is then clamped by the floating collar and the rams within the box section members 31 are retracted to return the vehicle to its previous length. The aircraft may then be manoeuvred to its desired position, after releasing aircraft brakes, the turntable permitting steering without the need to release the nose-wheel steering controls.

When the desired position of the aircraft has been achieved, the vehicle is disengaged in an operation which is the reverse of the sequence described.

I claim:

1. An aircraft ground-handling vehicle, comprising a chassis; front and rear wheels mounted on said chassis; a platform means mounted on said chassis for supporting an aircraft nose-wheel, the platform means being positioned relative to the wheels of the vehicle such that no part of the weight of the aircraft is transferred to the vehicle outside the wheelbase thereof; lifting means on said chassis adapted to lift the nose-wheel off the ground, without thereby loading the vehicle, wherein said platform means is movable beneath said nose-wheel without engaging the ground, thereby to engage and receive the nose-wheel onto the platform means.

2. A vehicle as claimed in claim 1 wherein said platform means comprises a platform and a turntable carried by said platform, and means for tilting the platform so as to be able to present an upwardly sloping surface to the nose-wheel before engagement thereof with the turntable.

3. A vehicle as claimed in claim 1 wherein said lifting means is a jack.

4. A vehicle as claimed in claim 3 wherein said lifting means comprising arm means mounted on said chassis and extendable for moving said lifting means to engage said nose-wheel and retractable relative to said platform means for enabling said platform means to be moved beneath said raised nose-wheel.

5. A vehicle as claimed in claim 4, wherein said platform means is secured relative to the vehicle axis whereby movement of said platform means beneath said nose-wheel is effected by movement of said vehicle.

6. A vehicle as claimed in claim 4 wherein said platform means is movable axially relative to said vehicle for moving said platform means beneath said nose-wheel.

7. A vehicle as claimed in claim 4, wherein said arm means is pivotally mounted on said vehicle.

8. A vehicle as claimed in claim 5 wherein said arm means is pivotally mounted on said vehicle.

9. A vehicle as claimed in claim 6 wherein said arm means is pivotally mounted on said vehicle.

10. A vehicle as claimed in claim 5 wherein said jack is adapted to engage said nose-wheel.

11. A vehicle as claimed in claim 6 wherein said jack is adapted to engage said nose-wheel.

12. A vehicle as claimed in claim 1 wherein said lifting means is engageable with the nose-wheel axle.

13. An aircraft ground-handling vehicle, comprising a chassis; front and rear wheels mounted on said chassis; a platform means mounted on said chassis for supporting an air craft nose-wheel, the platform means being positioned relative to the wheels of the vehicle such that no part of the weight of the aircraft is transferred to the vehicle outside the wheelbase thereof; and lifting means on said chassis adapted to lift the nose-wheel off the ground, without thereby loading the vehicle, wherein said platform means is movable beneath said nose-wheel without engaging the ground, thereby to engage and receive the nose-wheel onto the platform means; said lifting means comprising a jack and arm means carrying said jack and extendable for moving said arm means to engage said nose-wheel and retractable relative to said platform means for enabling said platform means to be moved beneath said raised nose-wheel.

* * * * *